US006832652B1

(12) United States Patent
Dillenbeck et al.

(10) Patent No.: US 6,832,652 B1
(45) Date of Patent: Dec. 21, 2004

(54) ULTRA LOW DENSITY CEMENTITIOUS SLURRIES FOR USE IN CEMENTING OF OIL AND GAS WELLS

(75) Inventors: Robert L. Dillenbeck, Spring, TX (US); Thomas Heinold, Houston, TX (US); Murray J. Rogers, Houston, TX (US); Windal S. Bray, Cypress, TX (US)

(73) Assignee: BJ Services Company, Houston, TX (US)

( * ) Notice: Subject to any disclaimer, the term of this patent is extended or adjusted under 35 U.S.C. 154(b) by 0 days.

(21) Appl. No.: 10/646,147

(22) Filed: Aug. 22, 2003

(51) Int. Cl.⁷ .............................................. E21B 33/13
(52) U.S. Cl. ...................................... 166/293; 106/705
(58) Field of Search ................................ 166/293, 294, 166/295; 106/705, 737, 819, 820, 823

(56) References Cited

U.S. PATENT DOCUMENTS

| | | | |
|---|---|---|---|
| 4,234,344 A | 11/1980 | Tinsley et al. | |
| 4,324,669 A | 4/1982 | Norman et al. | |
| 4,370,166 A | 1/1983 | Powers et al. | |
| 4,591,447 A | 5/1986 | Kubala | |
| 5,447,197 A | * 9/1995 | Rae et al. | 166/293 |
| 5,547,506 A | * 8/1996 | Rae et al. | 106/730 |
| 5,613,558 A | 3/1997 | Dillenbeck, III | |
| 6,173,778 B1 | * 1/2001 | Rae et al. | 166/293 |
| 6,367,550 B1 | 4/2002 | Chatterji et al. | |
| 6,491,421 B2 | 12/2002 | Rondeau et al. | |
| 6,508,305 B1 | 1/2003 | Brannon et al. | |
| 6,516,883 B1 | * 2/2003 | Chatterji et al. | 166/293 |
| 6,626,242 B2 | * 9/2003 | D'Almeida et al. | 166/292 |

* cited by examiner

*Primary Examiner*—David Bagnell
*Assistant Examiner*—Elton McWilliams
(74) *Attorney, Agent, or Firm*—Locke Liddell & Sapp LLP; John Wilson Jones

(57) ABSTRACT

The storable, low-density, hydraulically-active, cementitious slurry of the invention is suitable for cementing within a subterranean formation for oil or gas wells. The low-density slurry comprises a hydraulically-active cementitious material, a set retarder, a plasticizer, glass or ceramic micro-spheres, and a strengthening agent. Further the slurry is substantially free of a suspension agent. The storable, low-density, hydraulically-active, cementitious slurry is made by adding glass or ceramic micro-spheres to a hydraulically-active cementitious material, adding a strengthening agent to the microsphere containing composition, and mixing the resulting composition with water, a set retarder, and a plasticizer to generate a slurry, wherein the set retarder is present in an amount sufficient to allow storage of the slurry.

20 Claims, No Drawings

ULTRA LOW DENSITY CEMENTITIOUS SLURRIES FOR USE IN CEMENTING OF OIL AND GAS WELLS

FIELD OF THE INVENTION

This invention relates to ultra low density storable cementitious slurries useful for oil and gas well cementing, as well as to a method of cementing an oil or gas well using such slurries. Such cementitious slurries are further useful in the zonal isolation of subsurface formations.

BACKGROUND OF THE INVENTION

Hydraulic cements are cements that set and develop compressive strength due to a hydration reaction, not drying. Thus, hydraulic cements can set under water. Consequently, hydraulic cements are often used for cementing pipes or casings within a well bore of a subterranean formation for the construction of oil, gas and water wells, as well as other purposes, such as remedial squeeze cementing. In the oil and gas industry, successful cementing of well pipe and casing during oil and gas well completion requires cement slurries to exhibit a pumpable viscosity, fluid loss control, minimized settling of particles and the ability to set within a practical time.

Conventional mixing equipment is relatively complex and expensive since it must permit the addition of water to dry cement powder, homogenization of the mixture, measurement of its density and, if necessary, recirculation of the mixture. Such requirements further dictate the equipment's configuration. In addition, dry cement bulk transport equipment must usually be pressurized so that solids can be transferred pneumatically at relatively high rates to the cement pump. Once at the drilling site, the pneumatically conveyed cementing solids must be correctly proportioned and mixed with water, as well as other additives to form a pumpable slurry. The slurry must then be tested for the appropriate density to verify correct solids to water ratio. If cementing solids are not correctly proportioned, the quality of the cement diminishes.

It is sometimes necessary to use a lightweight cement when there is a weak subterranean formation. A lightweight cement exerts a lower hydrostatic pressure on the formation than do regular cements. The lightweight cements should be lower in density without sacrificing strength. The density can be lowered in these cements by either adding sealed microballoons or creating a foam by injecting the cement with a gas, such as nitrogen. This foaming operation can be difficult because additional nitrogen equipment is required and the addition of gas must occur onsite which requires that the density of the slurry be carefully measured before use. Methods of measuring the density as the cement is mixed are known. Such methods can be an inaccurate means of cement solids to water ratio verification—when the density of the cement approaches the density of water, making differentiation between cement and water difficult.

Low density cements have been used previously. For example, these cements have been disclosed in U.S. Pat. Nos. 4,370,166 and 4,234,344. These patents disclose the use of inorganic material in order to lower the ultimate density of the cement. However, the difficulty with these disclosures, and other conventional cementing slurries, is that they set quickly and therefore cannot be made in advance of their use. A delay in the drilling operation delays the cementing job. If personnel and equipment for cementing idly wait onsite until the drilling ends, a delay can increase the cost of the cementing job. A slurry made in advance and stored until needed would allow the personnel and equipment to make the storable slurry, regardless of whether drilling had ceased or even begun.

Storable cementitious slurries have been made in the past. Examples of these attempts are demonstrated in U.S. Pat. Nos. 5,447,197; 5,547,506; and 6,173,778. These patents, however, do not disclose the use of low density slurries in a storable form.

Therefore, there is a need to create an ultra low-density, storable, slurry capable of being used in cementing a well formation.

SUMMARY OF THE INVENTION

The storable, low-density, hydraulically-active, cementitious slurry of the invention is suitable for cementing within a subterranean formation for oil or gas wells. The low-density slurry comprises a hydraulically-active cementitious material, a set retarder, a plasticizer, glass or ceramic microspheres, and a strengthening agent. Further the slurry is substantially free of a suspension agent. Use of such slurries in oil or gas wells helps to establish zonal isolation within the cemented wellbore of the subsurface formations.

The storable slurry of the present invention allows the density of the cement to be predetermined and accurately measured before the cementitious slurry is shipped to the wellsite. This in turn, can reduce up-front cost for mechanical equipment such as foam generators and associated nitrogen pumps and storage vessels.

Further, this invention establishes an alternate means to accurately mix and place ultra-low density cement systems without the use of conventional continuous mix cementing equipment or foam and its associated equipment.

Further, this invention allows the reduction and/or elimination of typical and auxiliary cement mixing equipment and material on location such as cement pumps, nitrogen tanks and pumps and the personnel necessary to operate this equipment.

Further, the accurate control of the premixed slurry properties eliminates job uncertainties and leads to a significant improvement in QA/QC.

This invention allows the cementing of a subterranean formation using a low density cementitious slurry after it has been stored for a period of time. It further provides a low-density storable cement slurry that can be made at a different location from the job site. This storable slurry can then be transported to the job site before cementing.

The storable, low-density, hydraulically-active, cementitious slurry is made by adding glass or ceramic microspheres to a hydraulically-active cementitious material, adding a strengthening agent to the microsphere containing composition, and mixing the resulting composition with water, a set retarder, and a plasticizer to generate a slurry, wherein the set retarder is present in an amount sufficient to allow storage of the slurry wherein the slurry is substantially free of a suspension agent.

In one method of the invention, a subterranean formation for an oil or gas well is cemented with the storable, hydraulically-active, cementitious slurry formulated by mixing together a hydraulically-active cementitious material with a set retarder, plasticizer, glass or ceramic microspheres, and strengthening agent, wherein the storable slurry's characteristics remain within usable parameters during storage. The storable slurry is then stored until required for cementing, at which time it is activated by mixing together an activator with the storable slurry, pumped into the subterranean formation and allowed to set.

In another method of this invention the steps of the method of cementing the subterranean formation are performed at two different locations. In this method the stable, low-density, hydraulically-active, cementitious slurry is formulated at one location, transferred to a second location, activated at the second location, and then pumped into the subterranean formation for cementing.

Additional effects, features and advantages will be apparent in the written description that follows.

DETAILED DESCRIPTION OF THE INVENTION

A storable, hydraulically-active, cementitious slurry of the invention is made from a hydraulically-active cementitious material. The cementitious systems of the invention allow for the zonal isolation of wellbores. The cementitious slurries exhibit ultra low-densities, typically ranging from about 13.0 pounds per gallon (ppg) to about 6.0 ppg or less, preferably from about 10.0 ppg to about 8.0 ppg.

Hydraulically-active cementitious materials include materials with hydraulic properties, such as hydraulic cement, slag and blends of hydraulic cement and slag (slagment) which are well known in the art. The term "hydraulic cement" refers to any inorganic cement that hardens or sets due to hydration. In this disclosure, the term "hydraulically-active" refers to properties of a cementitious material that allow the material to set in a manner like hydraulic cement, either with or without additional activation. Hydraulic cements, for instance, include Portland cements, aluminous cements, pozzolan cements, fly ash cements, and the like. Thus, for example, any of the oilwell type cements of the class "A-H" as listed in the API Spec 10A, (22nd ed., January 1995 or alternatively ISO 10426-1), are suitable hydraulic cements. This also includes Commercial Lightweight cement and ASTM construction cements.

The type of slag used for the invention has hydraulic properties. The slag is preferably ground-granulated blast furnace slag with a minimum glass count of about 95% and a fine particle size of about 1 to about 100 $\mu$m, preferably less than about 45 $\mu$m, most preferably less than 10 $\mu$m or a fineness of about 310 to about 540 $m^2$/kg. See, e.g., U.S. Pat. Nos. 5,125,455 and 5,106,423. A slag slurry develops little strength without increasing the alkalinity of the slurry to initiate hydration. Slag alone can also produce a brittle set product and fluid loss from the slag slurry can be difficult to control.

Slagments are preferably blends of slag and portland cement. Examples of suitable slagments include blends ranging from about 90% cement with 10% slag to 10% cement with 90% slag, with a particularly preferred blend of 60% slag with 40% cement with all percentages based on the dry weight of each component.

Slagment and hydraulic cement are preferred cementitious materials. However, both of these materials react quickly with water and set at room temperature unless modified, and they are, therefore, much more difficult to control. However, storable slurries formed from hydraulic cement, especially portland cement, or slagment have the best overall performance characteristics for well cementing applications.

Hydraulically-active cementitious materials may also have minor amounts of extenders such as bentonite, gilsonite, and cementitious materials used either without any appreciable sand or aggregate material or admixed with a granular filling material such as sand, ground limestone, and the like.

The composition of the invention further contains a strengthening agent. The strengthening agent allows early and higher ultimate strength development of the slurry. The strengthening agent also aids in mixing flexibility since slight changes in the water do not have such a drastic effect on slurry properties. Such strengthening agents are typically finely-divided spherical particles. Suitable as strengthening agent are fumed metal oxides and metal powder. In a preferred embodiment, the strengthening agent is silica fume, aluminosilicate including zeolites, fly ash, alumina, aluminum metal powder, manganese oxide fume, ferrosilicon fume, wollastonite, hydrated calcium sulphoaluminate, such as those of the formula $Ca_6([Al(OH)_6]_2(SO_4)_3 \cdot 26H_2O$, salts containing sodium ions, such as sodium sulfate, sodium nitrate, sodium chloride, etc., and salts containing sulfate ions, such as calcium sulfate and potassium sulfate, as well as mixtures thereof. Silica flume is especially preferred. Preferably the particle size of the strengthening agent is less than 10 microns. Even more preferably the particle size is less than 7.5 microns. The strengthening agent is typically present in an amount of from about 3 to about 20 percent by weight of cement (BWOC).

A set retarder is necessary to prevent the setting of the slurry during storage. The characteristics of these set retarders are diverse and important. An effective amount of set retarder allows the storage of the slurries with minimal changes in the characteristics of both the stored and activated slurry. It is equally important that this effect is reversible after adding an effective amount or low concentration of activator to the slurry, even at low well circulating temperatures. In addition, the set retarder should preferably provide some dispersion of the slurry without overdispersion, and little effect on the compressive strength after activation and setting.

Suitable set retarders include glucoheptonates, such as sodium glucoheptonate, calcium glucoheptonate and magnesium glucoheptonate; lignin sulfonates, such as sodium lignosulfonate and calcium sodium lignosulfonate; gluconic acids gluconates, such as sodium gluconate, calcium gluconate and calcium sodium gluconate; phosphonates, such as the sodium salt of EDTA phosphonic acid; sugars, such as sucrose; hydroxycarboxylic acids, such as citric acid; and the like, as well as their blends. Calcium gluconate for hydraulic cement and slagment slurries and sodium glucoheptonate for slag slurries are especially preferred.

The amount of set retarder can vary, depending on the type of cementitious material, the type of set retarder selected and the desired storage time. Since this disclosure refers to liquid premixes of both slags and hydraulic cements, the term "gpb" refers to gallons per barrel of cementitious material premix. For slagments and hydraulic cements, typical amounts of retarder range from about 0.05 gpb to 0.4 gpb, preferably from about 0.05 gpb to 0.15 gpb, with about 0.05 gpb of retarder preferred. For slags, typical amounts of retarders range from 0.05 gpb to 0.4 gpb, with about 0.075 gpb of retarder preferred.

A plasticizing agent is used in the storable slurry to assist in control of the fluidity of the slurry. The amount of plasticizing agent depends of the type of hydraulically-active cementitious material used, selected suspending agent (if required) and desired density of the storable slurry. Specific examples of plasticizing agents include melamine sulfonic acid polymer condensation product (such as "SP5", "CORMIX", Warrington, England), sodium polyacrylate (such as "BEVALOID 6770", Rhone-Poulenc, Watford, England), naphthalene sulfonic acid, sodium salt of naphthalene sulfonate formaldehyde condensate, sodium sulfonated melamine formaldehyde (SMF) and sulfonatedstyrene maleic anhydride polymer (such as "SSMA"), (Miltemp, Milpark, Houston, Tex.). The preferred plasticizing agent is a sodium partially neutralized polyacrylate homopolymer which is commercially available from Alco Chemical as ALCOQUEST® 149.

The plasticizer should be present in amount from 0.05 gpb to 0.5 gpb. More preferably the amount should be 0.05 to 0.2 gpb, most preferably about 0.15 gpb.

Mixing water containing the above-mentioned additives with the dry hydraulically-active cementitious materials produces the storable slurry. A sufficient amount of water, preferably fresh water, should be added to the hydraulically-active cementitious material to form a liquid storable slurry of suitable consistency. A storable slurry with portland cement should have a density measuring in the range from about 6 to 13 lbm/gal and preferably in the range of about 7 to 11 lbm/gal, more preferably about 8 to 10 lbm/gal.

Depending upon the particular storable slurry, the amount of mixing water in the slurry of the present invention ranges from about 30 to 150 weight percent based upon the dry weight of cement and preferably is in the range of about 90 to 140 weight percent.

Additional dispersants such as polyacrylate, naphtalene sulfonic acid and the like, as well as fluid loss control agents such as hydroxyethyl cellulose, acrylic copolymers, grafted tannin polymer, or similar additives known in the art, may be added as required either to the storable base fluid or the final activated cement slurry.

In traditional low-density cements a lightweight additive is mixed with the cement. These additives include microspheres or a gas, such as nitrogen or compressed air. In a preferred embodiment, glass or ceramic microspheres are employed. Preferably, the microspheres exhibit a density of between from about 0.25 to about 0.6, most preferably about 0.35 to 0.40, g/cc and an isotatic crush resistance of from about 2000 to about 18,000 psi (measured for 2 minutes in a 2 inch cell). More preferably the spheres are made out of borasilicate glass. Most preferred microspheres are commercially available from 3M and are sold under the name Scotchlite™ Glass Bubbles HGS Series. They are manufactured with tolerances for a specific pressure. At a given pressure only less than 20% of the microspheres are crushed. It is necessary therefore to first determine the amount of hydrostatic pressure that the cement will be under, and then use the microspheres designed for such tolerances.

The amount of microspheres used is based on the desired cement slurry density once placed in the wellbore and exposed to downhole pressures. Once the pressure is found, one will know which microspheres must be used based on the manufactured tolerances of the sealed microspheres. Then, the desired density must be determined. It is then possible to determine the amount of microspheres necessary to effectuate the desired density as is known in the art. Typically, the microspheres are in the composition at a concentration of from about 20 to about 100 by weight of cement (BWOC).

Storable slurries known in the art generally require the use of a suspension agent. This is seen in U.S. Pat. No. 5,447,197. The present invention contains substantially no suspending agent. While some suspending agent can be used it is preferable to have less than 0.5% by weight of water (BWOW). It has been found that the amounts of suspension agent used in the prior art have no positive effect on the slurries of the present invention. In fact, when a suspending agent is used, the slurry becomes too viscous and it is more difficult to maintain fluidity as well as the activated downhole properties.

Under normal conditions, the storable slurries of the invention have considerable longevity. The storable slurry of the invention should remain stable as a liquid, preferably for about a week and more preferably about three to four weeks without setting. In certain cases, storage times in excess of two months can be achieved. Changes in thickening time of the activated hydraulic cement slurries, even after prolonged storage of the non-activated slurry, are not excessive and such changes are readily determined and adjusted using techniques known in the art.

At the time of cementing, the stored slurry is activated, pumped into the well and allowed to set. Activation occurs by adding an activator or sufficient downhole temperature. The activator or downhole temperature initiates hydration and allows the slurry to set after a predetermined pumping time.

The activator must counteract the set retarder while having a minimal effect on final slurry properties or set characteristics, such as rheology and fluid loss when used in an effective amount. In addition, the activator should be easy to mix and handle, such as a liquid or dry powder; economical; widely available at reasonable purity; safe to ship and handle and environmentally acceptable.

Activators for a storable slurry include solutions of Group IA and IIA hydroxides, such as sodium hydroxide, magnesium hydroxide and calcium hydroxide; sulfates, such as sodium sulfate; aluminates, such as sodium aluminate and potassium aluminate; carbonates, such as sodium carbonate; silicates; triethanolamine (TEA) and calcium chloride. Preferred activators are sodium silicates. Sodium silicate has a large number of industrial uses which include drilling fluids and waterproofing mortars and cements. For slag slurries a sodium silicate ("Crystal 120H", Crosfield, Warrington, England) with a particular silica/soda ratio is especially preferred. Sodium silicate ("Crystal 1100", Crosfield) with a different silica/soda ratio is especially preferred for hydraulic cement and slagment slurries. Typical concentrations of activator range from about 0.05 gpb to 3.5 gpb dependent on application.

There are two approaches for controlling the thickening time of the activated storable slurries. The first approach is to accurately meter or measure out the activator based on a dose-response curve so the stored slurry becomes "less retarded" and provides the desired thickening time. Because the slope of the dose-response curve may be steep, the slurries may be too sensitive to permit the accurate control of thickening at the wellsite.

The second approach is to "over-activate" the slurry and add additional or secondary set retarders, such as lignin sulfonates, tartrates, gluconates, glucoheptonates, and the like, to achieve the desired thickening time. The "over-activated" slurries respond normally to conventional levels of retarder and exhibit far less sensitivity. In addition, "over-activation" might boost the early compressive strength of the set slurries. A typical concentration of additional set retarder sodium lignosulfonate ("R12-L", 40% active, Boregard, Sarpsborg, Norway) ranges from 0 to about 1 gpb.

EXAMPLES

This invention is demonstrated, but not limited to, the following examples:

In all experiments, the storable cementious slurries were made using the following components:

"TXI Litewate" as lightweight oil well cement, commercially available from Texas Industries, Dallas, Tex.;

gluconic acid set retarder, commercially available from BJ Services, Houston, Tex. under the name "LSR-1";

sodium partially neutralized polyacrylate homopolymer as plasticizer;

sodium naphthalene sulfonate-formaldehyde copolymer as dispersant;

uncompacted silica fume as strengthening agent;

grafted tannin polymer as fluid loss control agent; and borosilicate glass microspheres, commercially available as Scotchlite™ HGS Gas Bubbles HGS6000 from The 3M Company, having a density of 0.46 g/cc and an isotatic crush strength of 6000 psi.

Three slurries were prepared as follows:

Slurry 1: Base System+Additional Dispersant+Additional Fluid Loss Control

Slurry 2: Base System+Additional Dispersant

Slurry 3: Base System

The Base System comprises about 100 weight percent of TXI Litewate, about 0.8 weight percent of set retarder, about 1.7 weight percent plasticizer, about 69 weight percent of borosilicate glass microspheres and about 13 weight percent of silica fume. Slurry 2 contained an additional 1.2 weight percent of dispersant. In addition to the dispersant, Slurry 1 contains 2 weight percent of fluid loss control.

The Base System cementitious slurry was prepared as follows. To the mixwater placed in a plastic container, was added the set retarder and plasticizer which was stirred with a paddle stirrer. Once dissolved, the TXI Litewate, borosilicate glass spheres and silica fume were added slowly to the water to avoid lumping of the cementious material. A sufficient amount of freshwater was added to reach a density of about 8.1 ppg. Dispersant and fluid loss control agent were further added to Slurry 2 and Slurry 1, respectively. The resulting slurry was stirred for about 30 minutes to ensure homogenity and dissolve any remaining lumps of dry material. The plastic container was then sealed with a lid to prevent evaporation of water from the slurry, and stored for an extended period of time. The rheology was determined and the plastic viscosity (PV) and yield point (YP) in accordance with testing procedures outlined in API Recommended Practice 10B 22$^{nd}$ Edition, December 1997.

At regular intervals during the storage the slurry conditions were checked. The stability of the system as illustrated in Table 1 was monitored. Using a small spatula the general appearance, gellation, freewater and settling were noted. While in storage the slurry was maintained on a regular basis through thorough agitation with a paddle stirrer.

TABLE 1

Stability of Storable Slurry Systems

| Slurry No. | Slurry Density ppg | Cement Type | Retarder % BWOW | Storage Time Days | Comments |
|---|---|---|---|---|---|
| 1 | 8.1 | TXI Litewate | 0.5 LSR-1 | 9 | Stable/Viscous |
| 2 | 8.1 | TXI Litewate | 0.5 LSR-1 | 15 | Stable |
| 3 | 8.1 | TXI Litewate | 0.5 LSR-1 | 12 | Stable/Gel |

Rheology readings as shown in Table 2 were then taken on a daily basis to monitor the shelf life of the system. Under normal circumstances the slurry systems typically experienced a gradual increase in slurry viscosity, as well as gelling, during the storage period before it ultimately reached the end of its shelf life and set hard, rendering the slurry useless. Both Fann 35 viscometer readings and the calculated Plastic viscosity (PV) and Yield Points (YP) are displayed in Table 2.

TABLE 2

Rheological Properties of Storable Base Fluid

| Slurry No. | Slurry Density ppg | Storage Time Days | Base Fluid Rheologies at 80° F. 600/300/200/100/6/3 | PV | YP |
|---|---|---|---|---|---|
| 1 | 8.1 | 2 | 600/370/264/150/16/10 | 330 | 40 |
|   |     | 5 | 600/396/284/166/16/10 | 345 | 51 |
|   |     | 8 | 600/520/392/238/32/22 | 423 | 97 |
| 2 | 8.1 | 2 | 140/76/54/30/6/6 | 69 | 7 |
|   |     | 5 | 148/80/56/30/6/4 | 75 | 5 |
|   |     | 8 | 148/82/56/28/6/2 | 81 | 1 |
|   |     | 15 | 162/94/66/34/6/4 | 90 | 4 |
| 3 | 8.1 | 2 | 112/68/54/36/16/12 | 48 | 20 |
|   |     | 5 | 122/76/62/42/18/16 | 51 | 25 |
|   |     | 9 | 140/98/78/60/32/26 | 57 | 41 |

The activation and thickening time testing of the slurry systems was tested with three stored slurries.

Slurry 1 was constituted of 69% BWOC Scotchlite HGS 6000 borosilicate glass microspheres, 13% BWOC un-compacted silica fume, 0.5% BWOW set retarder, 1.0% BWOW plasticizer, 1.2% BWOC dispersant and 2.0% BWOC fluid loss additive.

Slurry 2 was constituted of 69% BWOC Scotchlite HGS 6000 borosilicate glass microspheres, 13% BWOC un-compacted silica fume, 0.5% BWOW set retarder, 1.0% BWOW plasticizer, and 1.2% BWOC dispersant.

Slurry 3 was constituted of 69% BWOC Scotchlite HGS 6000 borosilicate glass microspheres, 13% BWOC un-compacted silica fume, 0.5% BWOW set retarder, 1.0% BWOW plasticizer.

The slurries were placed on an electronic scale and triethanolamine (TEA) as activator in the amount of 0.5 gpb was added. The slurry was then placed in a Waring blender and stirred at +/-2000 rpm for approximately 35 seconds to ensure the full dispersion of the activator and additives. Antifoaming agent can be employed as required to reduce or prevent air entrainment. After final activation and blending, the slurry thickening time was tested using API RP-10B procedures. The results of such thickening time testing are presented in Tables 3, 4, and 5 below for Slurries 1, 2 and 3, respectively:

TABLE 3

Slurry 1

| Cement Brand | Temperature ° F. | Age of Base Fluid | Thickening Time Hours | Base Fluid Rheologies - 80° F. | |
|---|---|---|---|---|---|
|   |   |   |   | PV | YP |
| TXI Litewate | 225 | 1 Days | 4:10 | | |
|   | 225 | 2 Days | 4:10 | 330 | 40 |
|   |     | 3 Days |      | 315 | 35 |
|   | 225 | 5 Days | 4:00 | 345 | 51 |
|   |     | 6 Days |      | 345 | 53 |
|   |     | 7 Days |      | 387 | 45 |
|   |     | 8 Days |      | 423 | 97 |

TABLE 4

Slurry 2

| Cement Brand | Temperature °F. | Age of Base Fluid | Thickening Time Hours | Base Fluid Rheologies - 80° F. | |
|---|---|---|---|---|---|
| | | | | PV | YP |
| TXI TLW | | 1 Days | | 69 | 9 |
| | 225 | 2 Days | 3:20 | 69 | 7 |
| | | 4 Days | | 72 | 6 |
| | 225 | 5 Days | 4:50 | 75 | 5 |
| | | 6 Days | | 72 | 2 |
| | | 7 Days | | 75 | 3 |
| | | 8 Days | | 81 | 1 |
| | | 11 Days | | 84 | 6 |
| | | 12 Days | | 81 | 5 |
| | | 13 Days | | 90 | 4 |
| | 225 | 14 Days | 5:00 | 90 | 4 |

TABLE 5

Slurry 3

| Cement Brand | Temperature °F. | Age of Base Fluid | Thickening Time Hours | Base Fluid Rheologies - 80° F. | |
|---|---|---|---|---|---|
| | | | | PV | YP |
| TXI TLW | | 2 Days | | 48 | 20 |
| | 225 | 3 Days | 3:10 | 51 | 19 |
| | | 4 Days | | 48 | 18 |
| | | 5 Days | | 51 | 25 |
| | 225 | 6 Days | 3:20 | 54 | 26 |
| | | 9 Days | | 57 | 41 |
| | | 10 Days | | 60 | 46 |
| | | 11 Days | | 72 | 58 |

As is illustrated in Tables 3, 4, and 5, the system demonstrated the ability to obtain fundamentally equivalent thickening time under identical downhole conditions, after being stored in a liquid state at surface conditions for days at a time.

To confirm the compressive strength of the cured cement that had previously been stored in a liquid state, test data was obtained through API RP-10B destructive crush tests on samples from slurries 1 and 2 measuring 2×2×2 in. After activating the slurry with 0.5 gpb triethylamine and curing the cement at 260° F., 24 hour and 48 hour compressive strength data as shown in Table 6 were obtained.

TABLE 6

Compressive Strength Data at 260° F.

| Slurry No. | Slurry Density ppg | Cement Type | Activator gpb | 24 hour Compressive Strength (PSI) | 48 hour Compressive Strength (PSI) |
|---|---|---|---|---|---|
| 1 | 8.1 | TXI Litewate | 0.5 TEA | 1220 | 2875 |
| 2 | 8.1 | TXI Litewate | 0.5 TEA | 880 | 1730 |

From the foregoing, it will be observed that numerous variations and modifications may be effected without departing from the true spirit and scope of the novel concepts of the invention.

What is claimed is:

1. A method of cementing within a subterranean formation for an oil and gas well, comprising:

(a) activating a storable, low-density, hydraulically-active, cementitious slurry of:
  (i.) a hydraulically-active cementitious material;
  (ii.) a set retarder;
  (iii.) a plasticizer;
  (iv.) glass or ceramic micro-spheres; and
  (v.) a strengthening agent
  wherein the slurry is substantially free of a suspension agent;
(b) pumping the activated slurry into the subterranean formation; and
(c) allowing the activated slurry to set.

2. The method of claim 1, wherein the storable, low-density, hydraulically-active, cementitious slurry is activated with a compound selected from the group consisting of Group IA and IIA hydroxides, sulfates, aluminates, carbonates, and silicates; triethanolamine; and calcium chloride.

3. The method of claim 2, wherein the activating compound is sodium silicate.

4. The method of claim 1, wherein the plasticizer is selected from the group consisting of melamine sulfonic acid polymer, sodium polyacrylate, sodium salt of naphthalene sulfonate formaldehyde condensate, napthalene sulfonic acid polymer, and sulfonated styrene maleic anhydride polymer, or a mixture thereof.

5. The method of claim 4, wherein the plasticizer is sodium partially neutralized polyacrylate homopolymer.

6. The method of claim 1, wherein the set retarder is selected the group consisting of hydroxycarboxylic acids, glucoheptonates, lignin sulfonates, gluconates, phosphonates, and sugars.

7. The method of claim 1, wherein the glass or ceramic micro-spheres are of a density and an amount sufficient to effectuate a density to the storable, cementitious slurry between from about 6 to about 13 lbs/gallon.

8. The method of claim 1, wherein the strengthening agent is silica fume, aluminosilicate, fly ash, alumina, aluminum metal powder, manganese oxide fume, ferro-silicon fume, wollastonite, hydrated calcium sulphoaluminate, sodium sulfate, sodium nitrate, sodium chloride, calcium sulfate or potassium sulfate.

9. The method of claim 1, wherein the micro-spheres are borosilicate glass.

10. The method of claim 1, wherein the micro-spheres are ceramic.

11. A method of cementing within a subterranean formation for an oil and gas well, the method which comprises the steps of:

(a) formulating a storable, low-density, hydraulically-active, cementitious slurry by mixing together a hydraulically-active cementitious material with a set retarder, plasticizer, glass or ceramic micro-spheres, and strengthening agent;
(b) storing the slurry until required for cementing;
(c) activating the slurry;
(d) pumping the activated slurry into the subterranean formation; and
(e) allowing the activated slurry to set
wherein the slurry formulated in step (a) is substantially free of a suspension agent.

12. The method of claim 11, wherein the micro-spheres are borosilicate glass.

13. The method of claim 11, wherein the microspheres are ceramic.

14. The method of claim 11, wherein the storable, low-density, hydraulically-active, cementitious slurry is transferred to a second location prior to step (c).

15. The method of claim 14, wherein the second location is the site of the wellbore.

16. The method of claim 11, wherein the set retarder is selected from the group consisting of hydroxycarboxylic acids, glucoheptonates, lignin sulfonates, gluconates, phosphonates, and sugars.

17. The method of claim 11, wherein the plasticizer is selected from the group consisting of melamine sulfonic acid polymer, sodium polyacrylate, sodium salt of naphthalene sulfonate formaldehyde condensate, napthalene sulfonic acid polymer, and sulfonated styrene maleic anhydride polymer, or a mixture thereof.

18. The method of claim 11, wherein the glass or ceramic micro-spheres are of a density and an amount sufficient to effectuate a density to the storable, cementitious slurry between from about 6 to about 13 lbs/gallon.

19. The method of claim 11, wherein the strengthening agent is silica fume, aluminosilicate, fly ash, alumina, aluminum metal powder, manganese oxide fume, ferro-silicon fume, wollastonite, hydrated calcium sulphoaluminate, sodium sulfate, sodium nitrate, sodium chloride, calcium sulfate or potassium sulfate.

20. The method of claim 19, wherein the strengthening agent is silica fume.

* * * * *